Oct. 23, 1928. S. O. MARTIN Re. 17,117

DITCHING PLOW

2 Sheets-Sheet 1

Original Filed Oct. 25, 1926

Inventor

Scott O. Martin.

By A. J. O'Brien

Attorney

Oct. 23, 1928. S. O. MARTIN Re. 17,117

DITCHING PLOW

2 Sheets-Sheet 2

Original Filed Oct. 25, 1926

Inventor

Scott O. Martin.

By A. J. O'Brien

Attorney

Reissued Oct. 23, 1928. Re. 17,117

UNITED STATES PATENT OFFICE.

SCOTT O. MARTIN, OF DENVER, COLORADO.

DITCHING PLOW.

Original No. 1,648,236, dated November 8, 1927, Serial No. 143,920, filed October 25, 1926. Application for reissue filed April 27, 1928. Serial No. 273,409.

This invention relates to improvements in ditching plows of the type described and claimed in United States Letters Patent No. 1,311,829 granted to me July 29, 1919.

It is the object of this invention to produce a ditching plow of the type referred to above which shall be very substantially constructed and which shall be provided with a variety of adjustments whereby it becomes possible to vary the depth and width of the ditch to suit any conditions that might be met with in actual practice. As it is often necessary to run ditches along hillsides, I intend to provide this plow with means which will make it possible to maintain the plow in a substantially horizontal position regardless of the inclination of the ground that is being ditched.

The above and other objects which may become apparent as the description proceeds are attained by means of a construction and arrangement of parts which will now be described in detail, reference for this purpose being had to the accompanying drawings on which the preferred embodiment of the invention has been illustrated and in which.

Figure 3:
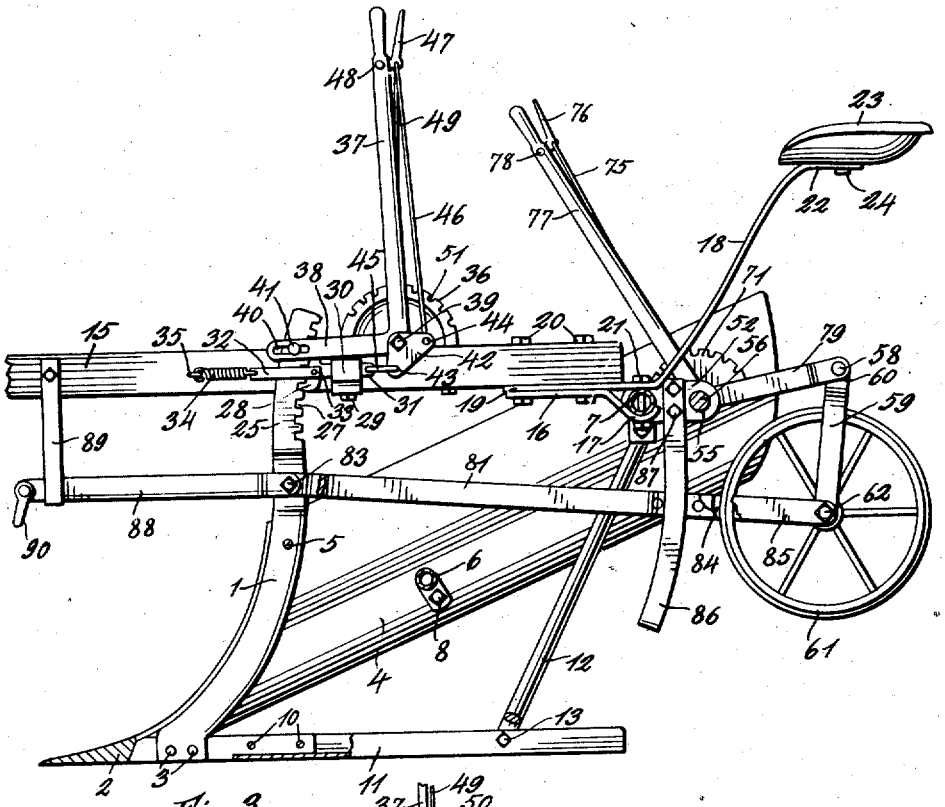
Fig. 3 is a longitudinal section taken on line 3—3, Fig. 1.
Figure 4:
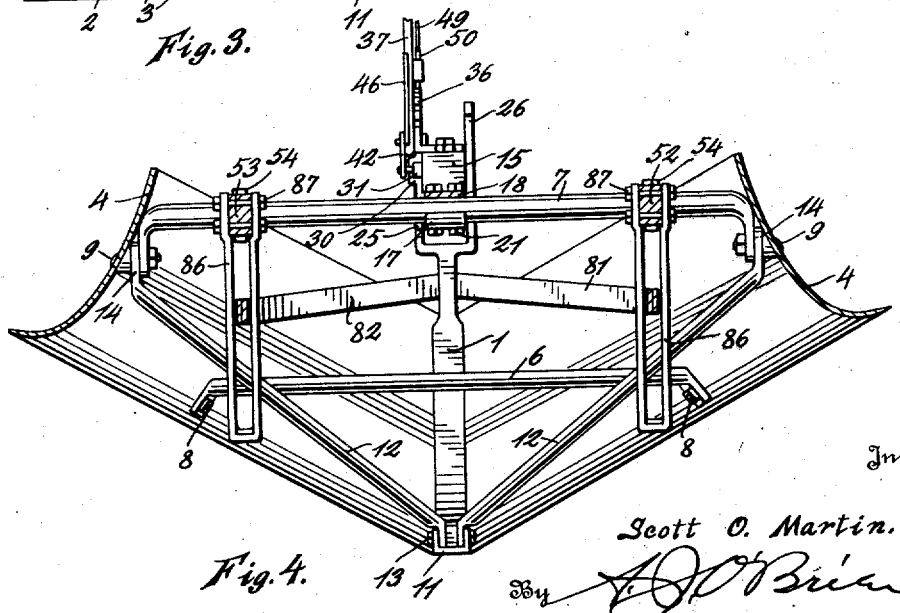
Fig. 4 is a section taken on line 4—4, Fig. 1.

The plow comprises a curved beam portion 1 whose lower end is secured to the pointed bar 2 by means of rivets 3. Combined shares and mold boards 4 are secured to the sides of beam 1 by means of bolts 5. These mold boards extend rearwardly and upwardly with respect to the pointed bar 2 and form an angle with each other in the manner shown quite clearly in the drawing. Transverse brace members 6 and 7 extend between the mold boards 4 and are secured to the latter by means of bolts 8 and 9. The pointed bar 2 extends rearwardly beyond the point of connection to the beam 1 and is provided with spaced openings 10 for the reception of bolts or rivets by means of which the channel bar 11 is secured thereto. The bar 11 forms a rearward extension of the pointed bar 2 and has its rear end secured to the lower end of the upwardly extending braces 12 by means of a bolt 13. The upper ends of the bars 12 have been indicated by numeral 14 and are clamped between the ends of the bar 7 and the mold board 4 by means of the bolts 9 in the manner quite clearly shown in Figure 4. The bars 2 and 11 form a runner on which the plow rests when in operative position. A tongue 15 has secured to its rear end a steel clamping bar 16 whose rear end is offset and curved in the manner designated by numeral 17. A bar 18 of spring steel has an end portion 19 that is located between the bar 16 and the lower side of the tongue. Bolts 20 extend through the tongue and through the parts 16 and 19, while another bolt 21 extends through the bar 18 the pipe 7 and the curved portion 17, all in the manner shown in Fig. 3. The upper end of the spring 18 has a rearwardly bent portion 22 to which the seat 23 is secured by means of a bolt 24. The upper end of the beam 1 has a fork consisting of two parallel bars 25 and 26, which are arcuate and have their concave sides towards the rear; these parts are curved about the center of pipe 7. The rear concave side of the part 25 is provided with notches 27 with which the reciprocable detent 28 cooperates. Secured to the tongue by means of a bolt 29 is a guide 30 through which the rearwardly projecting part 31 of the detent 28 extends. A link 32 is pivotally connected at 33 with the detent 28 and has secured to its forward end a coil spring 34 which is under tension and has its forward end secured to the tongue by means of an eye bolt 35. This spring tends to move the detent forwardly into engagement with the notches 27. A quadrant 36 is secured to the tongue by means of bolts. Pivotally attached to the quadrant is a bell crank lever having an upwardly extending handle portion 37 and a forwardly extending part 38. A bolt 39 passes through the bell crank lever at the angular portion thereof and serves as a pivot about which the lever may be rotated. The forward end of the portion 38 is provided with a slot 40 for the reception of a pin 41 that is secured to the part 25. Pivoted on the bolt 39 is a triangular lever 42 which is provided with openings 43 and 44, a link 45 extends from an opening in the part 31 to the opening 43 in the lever 42, and a rod 46 extends from the opening 44 to the handle portion 47 which is pivoted at 48. Another rod 49 extends from the handle portion 47 to a suitable detent 50 which cooperates with the notches 51 in the quadrant 36. When the operator grasps the handle 37 and moves the handle portion 47 about its pivot 48, he releases the detent 50 and the detent 28, and therefore when the handle 37 is rocked about its pivot 39, the beam 1 can be raised and lowered with respect to the tongue 15. When the parts have been moved to the desired position, pressure on the handle portion 47 is relieved and this permits the detents 28 and 50 to engage with the notches 27 and 51 so as to hold the parts in adjusted position.

Figure 1:
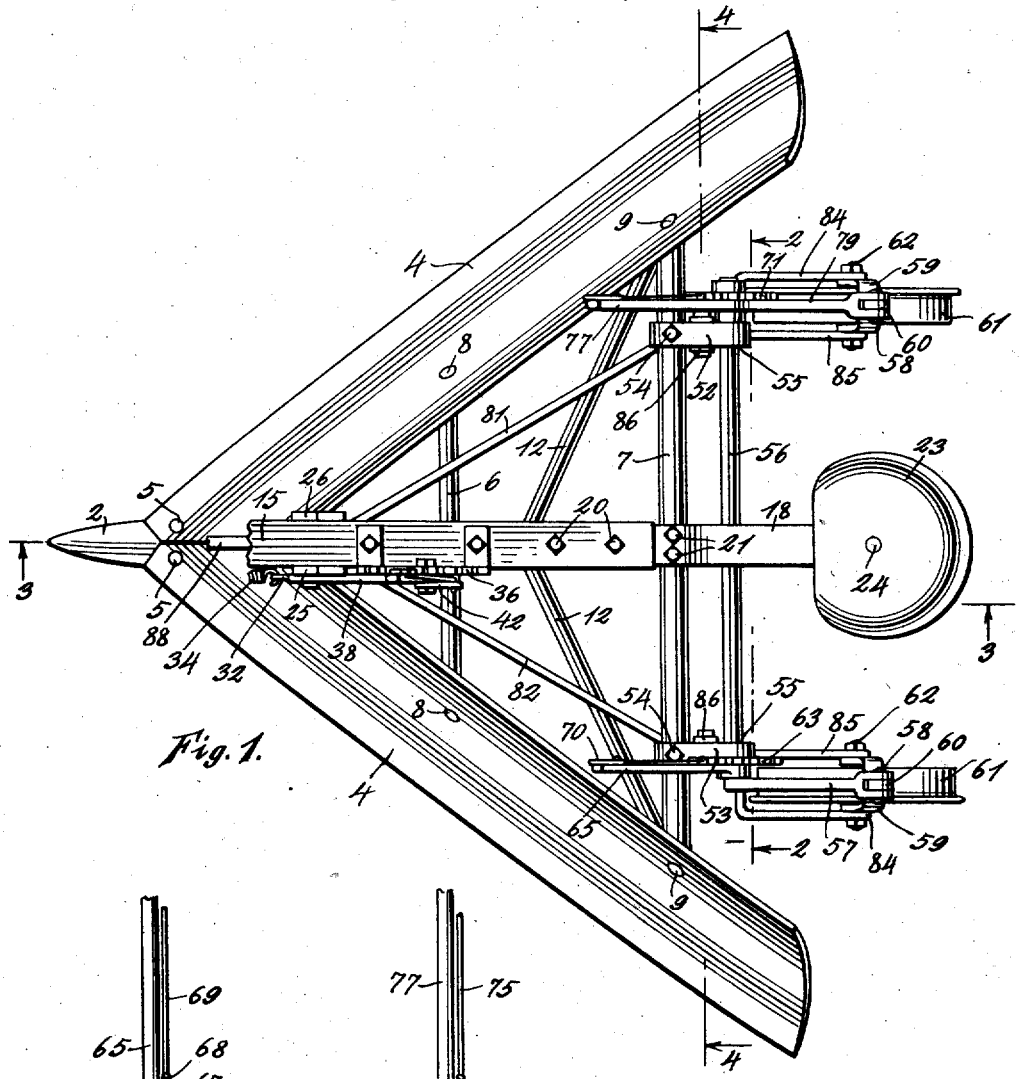
Fig. 1 is a plan view of the plow, the tongue having been broken away to better disclose the construction.
Figure 2:
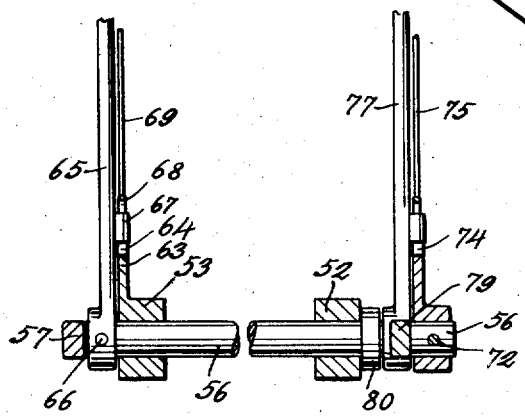
Fig. 2 is a section taken on line 2—2, Fig. 1.

In order to hold the plow steady, and to incline it to the desired extent with respect to the surface of the ground, I have secured to the pipe 7 two bearing members 52 and 53. These members are held against rotation with respect to pipe 7 by means of bolts 54 which pass through the pipe 7. Bearing members 52 and 53 are also provided with openings 55 for the reception of the shaft 56. One end of shaft 56 has a rearwardly extending arm 57 whose rear end is forked and provided with openings for the pivot pin 58. A wheel fork 59 has an upwardly projecting portion 60 which extends between the two parts of the forked portion of the arm 57 and is pivotally connected therewith by means of the bolt 58. Wheel 61 is pivoted to fork 59 and rotates about the axis of the bolt 62. Bearing 53 is provided with a quadrant 63 which is formed integral therewith and has its arcuate edge provided with a plurality of ratchet teeth 64. A lever 65 is secured to the shaft 56 between the arm 57 and the bearing 53 and is held against rotation on the shaft by means of a pin 66, Fig. 2. Secured to the lever 65 is a guide 67 within which the detent 68 reciprocates. A rod 69 connects the detent 68 with the handle portion 70, Fig. 1. By moving the handle portion 70, the detent 68 may be moved into and out of operative relative with the notches 64. It is now evident that by means of the lever 65 the shaft 56 may be rotated and in this manner the center of wheels 61 may be raised or lowered with respect to the runner 11 and with respect to the shares. Secured to the other end of shaft 56 is a quadrant 71 which is held against rotation on the shaft by means of the pin 72, Fig. 2. This quadrant is provided with teeth that are engaged by a detent 74 which is controlled by means of a rod 75 and a handle portion 76. The handle portion 76 is secured to the upper end of lever 77 by means of a pivot 78. The lower end of lever 77 is provided with an opening through which the shaft 56 passes and has an arm 79 formed integral with it. This arm like arm 57 has its rear end forked and has a wheel supporting fork 59 pivoted to it in the manner described in connection with arm 57. Lever 77 is located between the quadrant 71 and the bearing member 52 and is spaced from the latter by means of a washer 80, Fig. 2. When the detent 74 is raised out of engagement with the notches in the quadrant 71, lever 77 may be rotated with respect to shaft 56 and in this manner the arm 79 can be moved independently of the arm 57 so that the wheel that is attached to the arm 79 can be raised or lowered with respect to the wheel that is attached to arm 57. From the above description it will be apparent that the lever 65 can be employed for raising and lowering the two wheels simultaneously and an equal amount, while lever 77 can be employed for changing the relative position of the wheels.

Rods 81 and 82 have their forward ends pivoted to the beam 1 by means of a bolt 83. The rear ends of these rods are forked and are each provided with two spaced parallel bars 84 and 85 which straddle the wheel and which are provided with openings for the reception of the bolts 62. These bars prevent the wheels from rotating about the pivot 58 when the plow is in operation. In order to prevent sidewise motion of the wheels, the bars 81 and 82 extend through guide loops 86 in the manner shown in Fig. 4. These guide loops are secured at their upper ends to the bearings 52 and 53 by means of bolts 87.

When the plow is used on level ground, the wheels 61 are both adjusted at the same height, but if the plow is to be used on a hillside, one or the other of the wheels is adjusted to a lower position so that the plow itself retains a substantially horizontal position. By means of the lever 37 the point of the plow can be raised and lowered so as to facilitate transportation and so as to vary the depth of the ditch. A pull bar 88 has its rear end connected to the beam 1 by means of a bolt 83 and has its front end extending through the loop 89. A clevis 90 is pivotally attached to the front end of the pull bar and to this clevis the horses or the tractor are or is attached.

From the above description it will be apparent that I have provided an improved construction of ditching plow by means of which it is possible to adjust the parts so as to conform with the inclination of the land and by means of which the depth of the ditch can be easily regulated.

Having now described the invention what is claimed as new is:

1. A ditching plow comprising, in combination, two shares having one end connected with a vertically extending beam member and extending at an angle from each other, a transverse brace rod connecting the shares and holding them in spaced relation, a one piece tongue having its rear end connected with the transverse brace, means for connecting the beam directly with the tongue, a pair of wheels operatively connected with the shares, said wheels being located between the shares at a point to the rear of the transverse brace and means for securing the wheels to the brace.

2. A ditching plow comprising two shares placed at an angle to each other and having one end fastened together so as to form a point, a transverse brace member connecting the shares to the rear of the point, a one piece tongue having its rear end connected with the shares, two supporting wheels adjustably connected with the transverse brace and means for adjusting the centers of the wheels with respect to the shares.

3. A ditching plow comprising, in combination, a beam member, two shares each of which has one end connected with the beam member, said shares extending rearwardly from said beam member at an angle, a brace rod connecting said shares, a tongue secured at its rear end to said brace rod, means for connecting said beam member with the tongue, said means comprising a device for adjusting the distance from the tongue to the shares, a pair of spaced bearings secured to the brace rod, a shaft mounted in said bearings, one end of said shaft being bent at right angles, a quadrant secured to one of said bearings, a lever secured to the shaft, means carried by the lever for locking it in fixed position with respect to the quadrant, a quadrant secured to the shaft, a second lever rotatably connected with the shaft, said last named lever having an angularly extending arm, and a wheel secured to each of said arms.

4. A ditching plow comprising, in combination, a beam member, two shares each of which has one end connected with the beam member, said shares extending rearwardly from said beam member at an angle, a brace rod connecting said shares, a tongue secured at its rear end to said brace rod, means for connecting said beam member with the tongue, said means comprising a device for adjusting the distance from the tongue to the shares, a pair of spaced bearings secured to the brace rod, a shaft mounted in said bearings, one end of said shaft being bent at right angles, a quadrant secured to one of said bearings, a lever secured to the shaft, means carried by the lever for locking it in fixed position with respect to the quadrant, a quadrant secured to the shaft, a second lever rotatably connected with the shaft, said last named lever having an angularly extending arm, a wheel fork secured to each arm, a wheel secured to each fork and a brace member from each fork to the beam.

In testimony whereof I affix my signature.

SCOTT O. MARTIN.